US008473864B2

(12) United States Patent     (10) Patent No.: US 8,473,864 B2
Segal et al.     (45) Date of Patent: Jun. 25, 2013

(54) VIRTUAL VISUAL SELECTION MERCHANDISING INTERFACE

(75) Inventors: Mara Clair Segal, San Francisco, CA (US); Darrell Scott Mockus, San Francisco, CA (US)

(73) Assignee: Utique, Inc., San Francisco, CA (US)

( * ) Notice: Subject to any disclaimer, the term of this patent is extended or adjusted under 35 U.S.C. 154(b) by 107 days.

(21) Appl. No.: 12/804,418

(22) Filed: Jul. 21, 2010

(65) Prior Publication Data

US 2011/0022980 A1    Jan. 27, 2011

Related U.S. Application Data

(60) Provisional application No. 61/227,868, filed on Jul. 23, 2009.

(51) Int. Cl.
*G06F 3/048*      (2006.01)
(52) U.S. Cl.
USPC .......................................... 715/810; 715/764
(58) Field of Classification Search
USPC ................................................. 715/764, 810
See application file for complete search history.

(56) References Cited

U.S. PATENT DOCUMENTS

| | | | | |
|---|---|---|---|---|
| 6,193,154 | B1* | 2/2001 | Phillips et al. | 235/381 |
| 6,976,228 | B2* | 12/2005 | Bernhardson | 715/830 |
| 7,143,065 | B1* | 11/2006 | Enright | 705/43 |
| 7,195,157 | B2* | 3/2007 | Swartz et al. | 235/383 |
| 7,912,581 | B2* | 3/2011 | Walker et al. | 700/240 |
| 8,068,933 | B2* | 11/2011 | Walker et al. | 700/240 |
| 8,082,061 | B2* | 12/2011 | Segal et al. | 700/232 |
| 8,126,812 | B1* | 2/2012 | Peterson et al. | 705/59 |
| 2003/0001898 | A1* | 1/2003 | Bernhardson | 345/786 |
| 2004/0249711 | A1* | 12/2004 | Walker et al. | 705/14 |
| 2005/0040230 | A1* | 2/2005 | Swartz et al. | 235/383 |
| 2005/0211768 | A1* | 9/2005 | Stillman | 235/381 |
| 2006/0048070 | A1* | 3/2006 | Taylor et al. | 715/773 |
| 2006/0253347 | A1* | 11/2006 | Walker et al. | 705/28 |
| 2007/0024592 | A1* | 2/2007 | Fry | 345/173 |
| 2007/0294135 | A1* | 12/2007 | Zieger | 705/26 |
| 2008/0040211 | A1* | 2/2008 | Walker et al. | 705/14 |
| 2009/0144624 | A1* | 6/2009 | Barnes, Jr. | 715/719 |
| 2010/0100236 | A1* | 4/2010 | Segal et al. | 700/232 |
| 2010/0138037 | A1* | 6/2010 | Adelberg et al. | 700/241 |
| 2010/0262282 | A1* | 10/2010 | Segal et al. | 700/241 |
| 2012/0029691 | A1* | 2/2012 | Mockus et al. | 700/232 |

OTHER PUBLICATIONS http://venturebeat.files.wordpress.com/2010/12/utique_press_1.pdf, U*Tique and Studio Beautymix at Fred Segal Premiere U*Tique Shop, Apr. 9, 2009.*
http://www.creativematch.com/news/luxury-goods-from-a-vending/97250/, Luxury Goods from a Vending Machine?, May 27, 2009.*

* cited by examiner

*Primary Examiner* — William Bashore
*Assistant Examiner* — Henry Orr
(74) *Attorney, Agent, or Firm* — Kenneth S. Roberts; One LLP

(57) ABSTRACT

A vending arrangement for computerized vending machines, retail displays, automated retail stores, or the like presents a physical display comprising a plurality of viewing windows or modules containing items to be vended. The physical windows or modules are organized into visually recognizable patterns of rows or columns physically apparent from the machine exterior. A controlling computer responds to software and provides a visual display controlled by the software for establishing screens for inputting customer selections and displaying machine options. The screen presents virtual representations of physical displays arranged in said recognizable patterns, whereby images appearing the virtual screen selected and viewed by customers correspond to actual items available in corresponding physical displays.

11 Claims, 10 Drawing Sheets

VIRTUAL VISUAL SELECTION MERCHANDISING INTERFACE

CROSS-REFERENCE TO RELATED APPLICATION

This application is based upon U.S. Provisional Application Ser. No. 61/227,868 filed Jul. 23, 2009, and entitled "System And Method For Virtually Representing A Physical Display Within An Automated Retail Store Or Interactive Retail Display (Including Vending And Self-Service Check-Out Or Informational Platforms)", by coinventors Darrell Scott Mockus and Mara Segal, and priority based on said application is claimed.

BACKGROUND OF THE INVENTION

1. Field of the Invention

The present invention relates generally to automated vending machines. More specifically, the present invention relates to user interfaces, specifically to user interfaces in automated retail and vending machines, including kiosks and self-service retail machines or devices interfacing with them, which allows users to interact with a digital signage/automated retail/self-service kiosk through a touch interface in a quick and efficient way that mimics a physical display. It also establishes a convention around intuitive merchandising selection or shopping within digital environments, including the Internet and handheld devices.

2. Description of the Related Art

Numerous prior art vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the popular descriptions "automated retail," "interactive retail," and/or "interactive retail displays." Such vending machines may be deployed within a variety of commercial or public settings. They typically include illuminated displays that seek to showcase merchandise and offer convenient purchasing.

In the vending arts, users historically have made product selections by first noting the desired products' slot or space location, and then either physically selecting that product with a button or lever, or entering its location coordinates into the user interface. With several modern computerized designs, users may select a product by navigating through product categories to narrow the selection. Some interfaces have imagery, text listings and product groupings that users can navigate to find the desired product.

In general, the user interfaces employed with automated retail machines and computerized vending units have resembled user interface patterns employed by Internet websites. This method does not accurately represent the natural shopping process used by consumers in a physical retail environment. Current adaptations of automated retail units are less intuitive, and/or based on text and button-driven executions that are more mechanical in nature. These automated retail interfaces do not vary significantly in presentation from utility-driven sister devices including automated teller machines (ATMS) and ticket dispensing kiosks. These interfaces tend to rely on a series of categorization principles (pull down menus), hierarchical lists, or text-labeled buttons to lead users through selection and can feel less special or descriptive due to lower level graphic executions and reductive presentations of information, or prompts that may eliminate visual (picture-based) cues. These interfaces generally lack the fluidity in product selection that can occur in traditional shopping environments that rely heavily on the visual sense for product selection (visual merchandising).

In addition, the purchasing of multiple products via the interfaces in these machines can be difficult; the user must navigate between each product screen to select products for purchase.

Many users of automated retail machines know what they are looking for and wish to find, select and purchase the product they want as quickly as possible. Consumers typically utilize the visual sense to locate products. Within an automated retail store, consumers locate products in a physical display and then traditionally utilize a touch screen to navigate to the desired products for selection, education and/or purchase. In traditional retail stores, consumers can see only a product of interest, and then pick it up. Existing art and practices in automated retail interfaces do not effectively simulate the process of visually identifying a product from a shelf and selecting it based solely on a visual and/or a proximity cue (i.e., products of relevance being placed together on a shelf).

A new visual selection interface that establishes a visual paradigm for automated retail interface shopping processes and management tools is thus desirable. Such a visual selection interface must prioritize visual images as the primary medium to efficiently communicate a product for selection, or to navigate through products being merchandised in the machine or system. What is needed is a rapid visual selection and transaction process, essentially a visual method for instantly displaying products by virtually mimicking an adjacent, or relevant, product display/façade. Within this visual selection interface, users must be able to select and deselect products with a single touch (click). Key information like price and availability should be readily discernible prior to checkout. At checkout customers should have the option of adjusting quantities as needed prior to completing the transaction. Out of stock items should be noted by visual shading or changes in color of the product's virtual display module. Information such as product name, brand name, larger pictures or rich media (video, audio, etc.), product description and product price should be efficiently displayed if the user selects the option.

A quick and intuitive selection and purchasing method allows a reduction in error of selecting the wrong product and simplifies the selection process for the user, making it a more enjoyable shopping experience. It also enables purchase and shopping times to decrease, freeing up the machine to allow other users to make a purchase. Traditionally, the interfaces of self-service and automated retail machines do not allow more than one user to interact with the machine at any given time. Lastly, it can eliminate errors in product selection by providing visual validation of the selected product through the selection and checkout process.

In order to narrow the gap between an automated retail and traditional retail product selection experience, and to facilitate efficient and intuitive usage, the display area or product shelf should be virtualized, so it may be utilized in product selection. The virtual display area should populated with visual images of relevant merchandise so that the consumer may select merchandise based on pure visual recognition of the item vs. navigating through category header, text prompts, or menus.

It is thus desirable to provide a method and system that allows consumers to search and browse for products in a manner that closely resembles traditional retail shopping methods within automated retail stores. It is further desirable for such a system to use a variety of sound and lighting cues to enhance that traditional shopping experience by making more information readily, visibly available. It is also desirable to allow the user to make the most time efficient selection and transaction as possible by reducing the number of steps required to complete a transaction. It is also desirable to create intuitive visual selection methods for vending devices to cut down on selection error (which can occur when limited to alphanumerical associations, or proximity based lever, or index selection methods). Lastly it is desirable to extend such an interface to mobile devices and computers via web applications and websites to allow consumers to use this intuitive interface to shop remotely in order to create a consistent shopping convention across multiple digital shopping channels including handheld devices and the Internet.

BRIEF SUMMARY OF THE INVENTION

The invention comprises apparatus and a method to for virtually representing a physical display as an interactive user interface, with which a user may easily interact to select, view and/or purchase a product in an automated environment, including a vending machine, self-service platform, retail display, and/or automated retail platform.

Where convention in touch screen or digital interfaces is to use a combination of indexes, pull-down menus, informational hierarchies, text buttons and/or prompts to narrow a user selection, this invention establishes a visual paradigm by which users may efficiently and intuitively select a product for information or purchase. In addition, this virtually represented display can translate into a consistent, intuitive and efficient user experience on additional digital devices including a personal computer and/or handheld device. Lastly, the behavior of selecting products within the virtual display can be reflected via state changes in the virtual selection interface, the physical display, and the broader machine, including alterations of lighting and/or sound.

The virtual selection process creates a parallel virtual experience to the physical store experience, essentially using a digital version of store shelf or display as a consistent shopping architecture and user experience. Not only does this enable the consumer to select merchandise more naturally using their visual sense, but it also enables the consumer to perceive physical adjacencies of products within the display facilitating discovery of new products, or additional product selections (like complementary products sitting together on a store shelf). If the user is presented with traditional touch screen methods for locating their product, this merchandising opportunity is compromised.

This system allows a user to quickly and easily select a product by touching once on a virtual representation (generally a photograph, alternatively a drawing or an icon) of the physical products being displayed in the façade or facades adjacent to the user. When a user selects a product or item by touching the virtual representation of the product or item, additional information is displayed in a reserved display area while keeping the rest of virtual façade display intact. This information may include a larger picture of the product or item, a brief text description, pricing and additional options. The shading or coloring of the area of the immediate area around the product or item can change. This provides a visual cue to the user as to which product they are viewing. In addition, this coloring matches the lighting of the product in the physical façade matching the positioning indicated by the virtual screen.

Within the visual selection interface screen, the user is also presented with a button that allows them to add the product to a virtual shopping bag for purchase. Other additional options may include a button to reveal additional detailed information about the product which may include a rich media presentation such as additional imagery, sound and/or video, or merely additional basic product information. Options may also include a button to select a product sample. The virtual selection interface system also allows the local or remote (through an electronic data connection) configuration of the virtual display through a set of administrative tools. These tools allow an authorized administrator to configure the shape and layout of the virtual selection interface, mapping products/items to "spaces" or modules mimicking the physical display (the machine's façade or storefront). The layouts are stored as a dataset that is read at runtime and interpreted by the application to render the display.

An automated retail machine may contain a physical display of merchandise adjacent to a virtual touch screen display and inventory system all of which are designed to present and store inventory and information. Given the virtual selection interface is establishing a visual paradigm to present merchandising information intuitively and efficiently to a machine user, it can also be used for administrative functions such as inventorying and merchandising the physical display through visual prompts.

An administrator or service provider with proper authorization may access the visual selection interface in the administrator mode to view the desired planogram (merchandising arrangement) of the machine that they are servicing. The administrator can use this tool to arrange or rearrange items virtually before addressing items in the physical display. This virtualization method is a powerful visual merchandising and maintenance tool to adjust the planogram based on merchandising and/or design principles without having to invest in physical products or additional labor. This process allows a merchandiser to remotely set a display and communicate it via any Internet connected device. The planogram layout can be presented to an onsite clerk via the machine due to the visual selection interface convention. The onsite clerk can follow the virtual planogram to set the machine's physical display as informed by the lead merchandiser. This decreases waste in communicating planogram or inventory system shifts by providing a virtual convention at local machine level to guide clerks without additional paper printouts, or devices.

Inventory planning and direction can also be communicated via the visual selection interface convention. Authorized administrative inventory experts can work to maximize the space efficiency inside a machine by using an online tool with the same virtual representation of the inventory shelves. They can quickly manipulate items virtually to find the maximum use of space. This mapping can be saved and displayed locally on the machine in a virtual format where the local clerk can access it. The clerk may utilize virtual product imagery to place and verify that products are inventoried on the correct shelf. In addition, the visual display is more intuitive to follow by minimally trained staff reducing the number of stocking errors that in turn reduces the number of costly mis-dispenses.

Existing registered users can quickly sign into the system by identifying themselves during the visual selection process. Signing into the system allows the visual selection system to recognize registered users and recommend products to them based on their history. In addition it can suggest frequently purchased items to simplify their shopping experience by illuminating these products in the visual selection interface. This invention utilizes a software algorithm that can search registered user data records for matching cellular numbers, MAC (Media Access Control) Addresses or other identifying information.

The invention consists of a number of system components and a method to provide the capability to represent a physical merchandising display, or storefront, virtually, allowing users of the system a quick and natural way to select and purchase products and administrator's an efficient means to manage them. This method and system improves the ability of users to select and purchase products in an intuitive and natural way in an automated environment, including a vending machine, self-service platform, retail display, and/or automated retail platform and other complementary digital devices including handhelds and personal computers.

Furthermore, it does this through creating a system that allows authorized system administrators to easily create a "map" of the physical product display in a virtual environment. Any physical configuration can be virtualized and displayed as a graphical user interface. The visual selection interface product mapping is stored in a data store such as a database or file system and used to reconstruct the location of the items in the virtual display. Product mappings can be altered to match the items in the physical display any time the planogram changes.

The preferred invention provides a system and mechanism to inexpensively create and deploy a graphical user interface system that accomplishes the following:

a) Allows users to quickly find the products they wish to purchase;

b) Allows users to shop in a manner that closely represents a natural shopping experience;

c) Allows users to rapidly identify products initially seen in a physical display in an accompanying virtual interface by establishing a visual connection between the physical display and virtual interface using a graphical user interface method which leverages visual cues (including images of the products and simulation of the physical display) in addition to the proximity relationships between products in the physical display d) Allows users to purchase a product in a minimum amount of steps.

The invention consists of a series of physical merchandise displays, promotional/digital signage, automated mechanical/dispensing, and/or transactional modules that can be assembled and configured to create an automated retail store, vending unit, or interactive retail display of any size and link together via a virtual integrated network. The invention allows for a highly interactive graphical user interface that closely mimics a physical product display in either a machine or digital environment. Thus a basic object of the invention is to provide a more effective and consistent consumer retail experience on an automated retail store, vending unit or retail display and complementary digital devices.

Another important object is to provide an accessible product selection method and merchandising management method in a vending machine interface that uses a variety of methods to simulate a traditional shopping experience in a virtual setting.

Other objects are to provide:

a) a method and system that can easily and cost effectively create a more efficient automated retail user interface.

b) A system and method providing an interactive virtual representation of a physical product display, or storefront within a vending machine, automated retail store, or interactive retail display.

c) A system and method where the user can alternatively touch the façade in front of the displayed product to select the product and add it to the shopping cart/bag, or obtain more information about it.

d) A method for allowing users to efficiently select products with a minimal amount of steps, or reading of text.

e) A method for providing an intuitive virtual representation of merchandise based on a dense physical display of products. A method to increase accessibility of a vending, kiosk, or automated retail machine for disabled individuals by providing a more accessible and intuitive method of selection of the products/information contained within.

f) A method to increase the density or quantity of products perceptibly and legibly displayed in a single page of a graphical user interface by providing a convention to present that information concisely through a visual mapping method.

g) A purchase method that initiates a one step "checkout" routine anytime an act to pay or intent to purchase occurs (e.g. a user swipes a credit card or debit card, or uses a smart card, mobile phone payment system, etc.) within an automated retail machine or vending machine.

h) A method and system for allowing an authorized administrator to configure the shape and layout of a virtual display.

i) A method and system for allowing an authorized administrator to easily "map" products/items in a virtual display.

j) A method and system for allowing administrators and clerks access to a machine's planogram and inventory information at the machine without additional print-outs, or devices.

k) A method to provide an intuitive mapping of products contained in a physical display within a virtual touch screen for efficient and intuitive selection.

l) A method to decrease the number of shopping steps and errors in selecting and purchasing a product at a kiosk, vending, or automated retail machine.

m) A method for intuitively indicating and managing items that have been added to, or subtracted from a shopping cart/bag by the action of touching a virtual representation of the item. Validation of that action occurs by that item altering state (generally a color change in its display module).

n) A method that utilizes framing of products in a (physical) display architecture to increase intuitiveness of product selection in a digital environment.

o) A method for establishing virtual images as the primary navigation tool in an automated retail graphical user interface.

p) A method to rapidly reveal the critical information on a product, including pricing, by providing a virtual representation of the item that can be selected to reveal information in an expandable zone.

q) An intuitive and efficient way to instantly determine if a product is available for purchase in an automated retail store, or vending machine, by altering the hue of the module/area that the product is displayed in within a touch screen or graphical user interface.

r) An intuitive way to communicate guidelines and information in regards to merchandising and stocking a physical display in an automated retail machine or vending machine by utilizing a virtual representation of the physical display and/or shelving areas on the machine's touch screen to facilitate maintenance and stocking.

s) A method to provide a consistent visual merchandising convention between products in both a physical and virtual environment in order to facilitate interaction between environments.

t) A method to simulate natural shopping processes exhibited in a traditional retail environment within a physical vending machine, or automated retail display by recreating a store shelf, product display, storefront or façade experience within a virtual touch screen setting.

u) To provide a merchandising framework and user experience to select products that can be consistent and recognizable across multiple digital environments (and/or channels) including an automated retail or vending machine, interactive retail display, personal computer and mobile phone.

v) To provide a method to decrease selection errors in a vending machine, or automated retail machine by providing additional perceptual cues, or an intuitive visual map, including: product adjacencies in a nearby physical display, product lighting, and a clear visual representation of the product.

w) To provide visual administrative tools that can manipulate a virtual display as a method to remotely provide instruction to staff at the site of an automated vending machine.

x) To provide a method to simply select a product in a vending machine by touching on a virtual image of it without additional navigation through text or category prompts to reveal this product.

y) To provide a method to efficiently select multiple products for purchase in a single page of a graphical user interface based on the capability to present all of the products available within the machine within a single page through establishing a unique virtual visual merchandising convention.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

For purposes of disclosure, the three following co-pending U.S. utility applications, which are owned by the same assignee as in this case, are hereby incorporated by references, as if fully set forth herein:

(a) Pending U.S. utility application Ser. No. 12/589,277, entitled "Interactive and 3-D Multi-Sensor Touch Selection Interface For an Automated Retail Store, Vending Machine, Digital Sign, or Retail Display," filed Oct. 21, 2009, by coinventors Mara Segal, Darrell Mockus, and Russell Greenberg, that was based upon a prior pending U.S. Provisional Application Ser. No. 61/107,829, filed Oct. 23, 2008, and entitled "Interactive and 3-D Multi-Sensor Touch Selection Interface for an Automated Retail Store, Vending Machine, Digital Sign, or Retail Display"; and, (b) Pending U.S. utility application Ser. No. 12/589,164, entitled "Vending Machines With Lighting Interactivity And Item-Based Lighting Systems For Retail Display And Automated Retail Stores," filed Oct. 19, 2009 by coinventors Mara Segal, Darrell Mockus, and Russell Greenberg, that was based upon a prior pending U.S. Provisional Application Ser. No. 61/106,952, filed Oct. 20, 2008, and entitled "Lighting Interactivity And Item-Based Lighting Systems In Retail Display, Automated Retail Stores And Vending Machines," by the same coinventors.

(c) Pending U.S. utility application Ser. No. 12/798,803, entitled "Customer Retention System and Process in a Vending Unit, Retail Display or Automated Retail Store" filed Apr. 12, 2010, by coinventors Mara Segal, Darrell Mockus, and Russell Greenberg, that was based upon a prior pending U.S. Provisional Application Ser. No. 61/168,838 filed Apr. 13, 2009, and entitled "Customer Retention System And Automated Retail Store (Kiosk, Vending Unit, Automated Retail Display And Point-Of-Sale)", by coinventors Darrell Scott Mockus, Mara Segal and Russell Greenberg.

Figure 1:
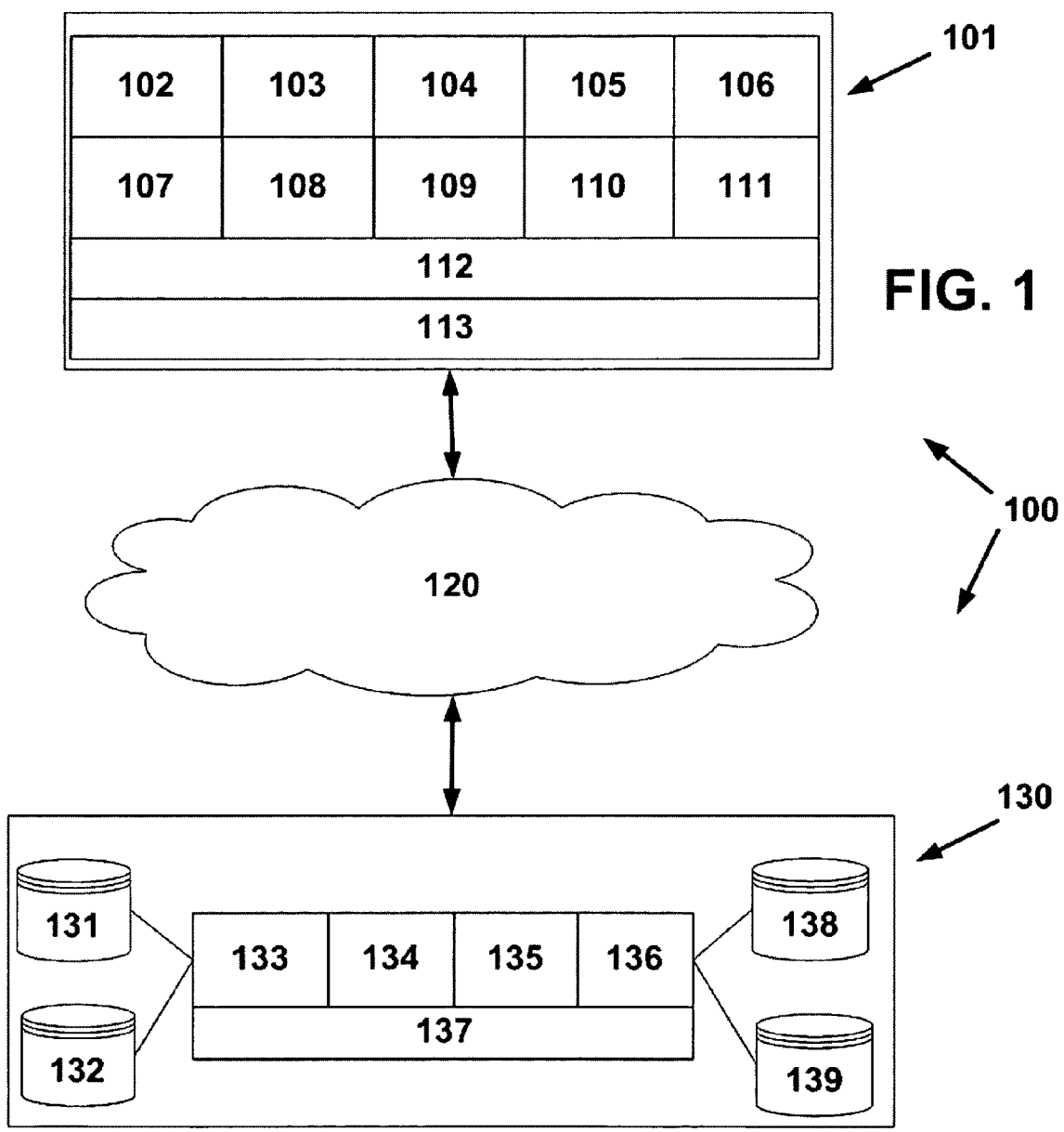
FIG. 1 is a block diagram of the system.
Figure 2:
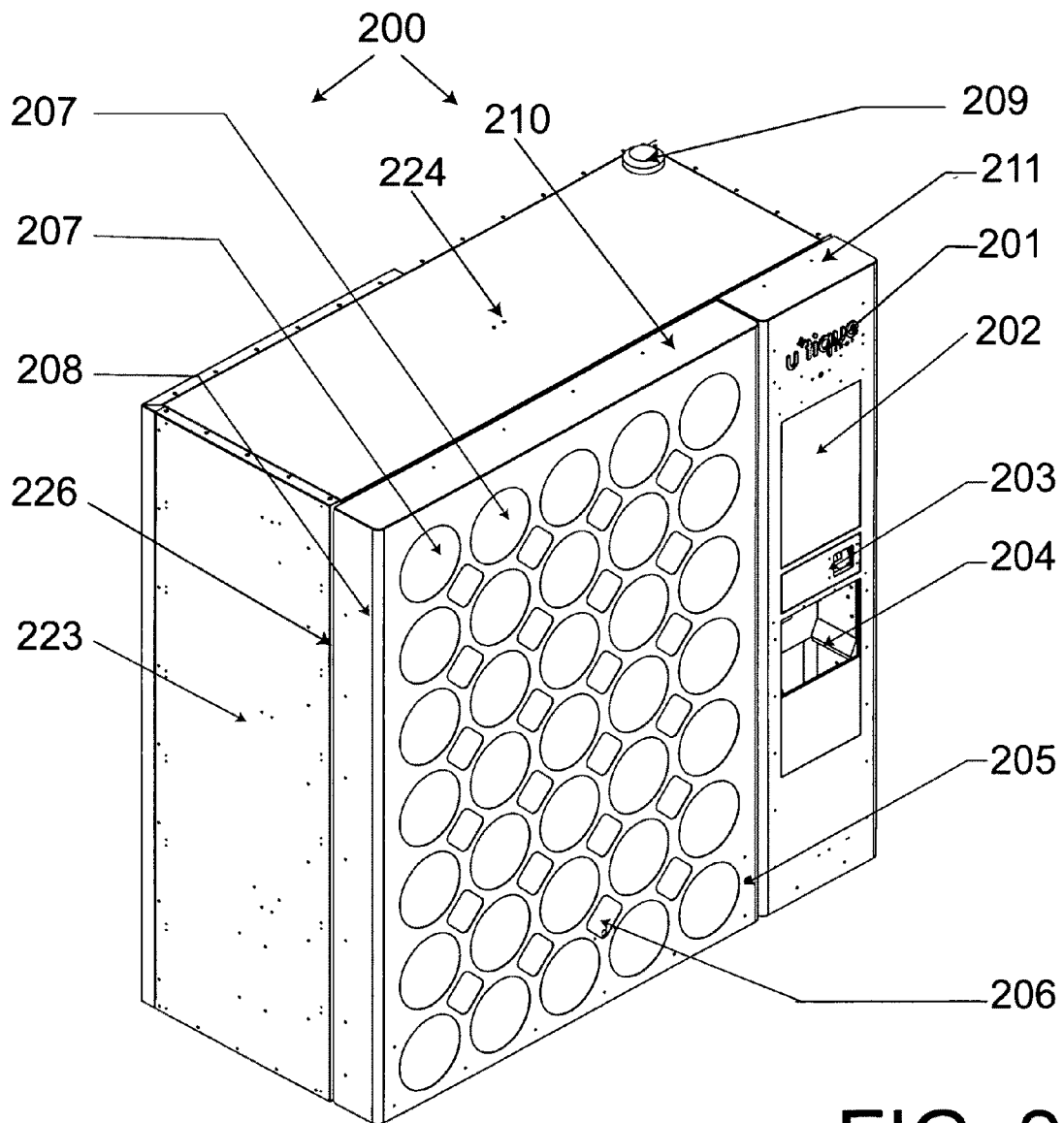
FIG. 2 is an isometric view of an assembled vending machine module.
Figure 3:
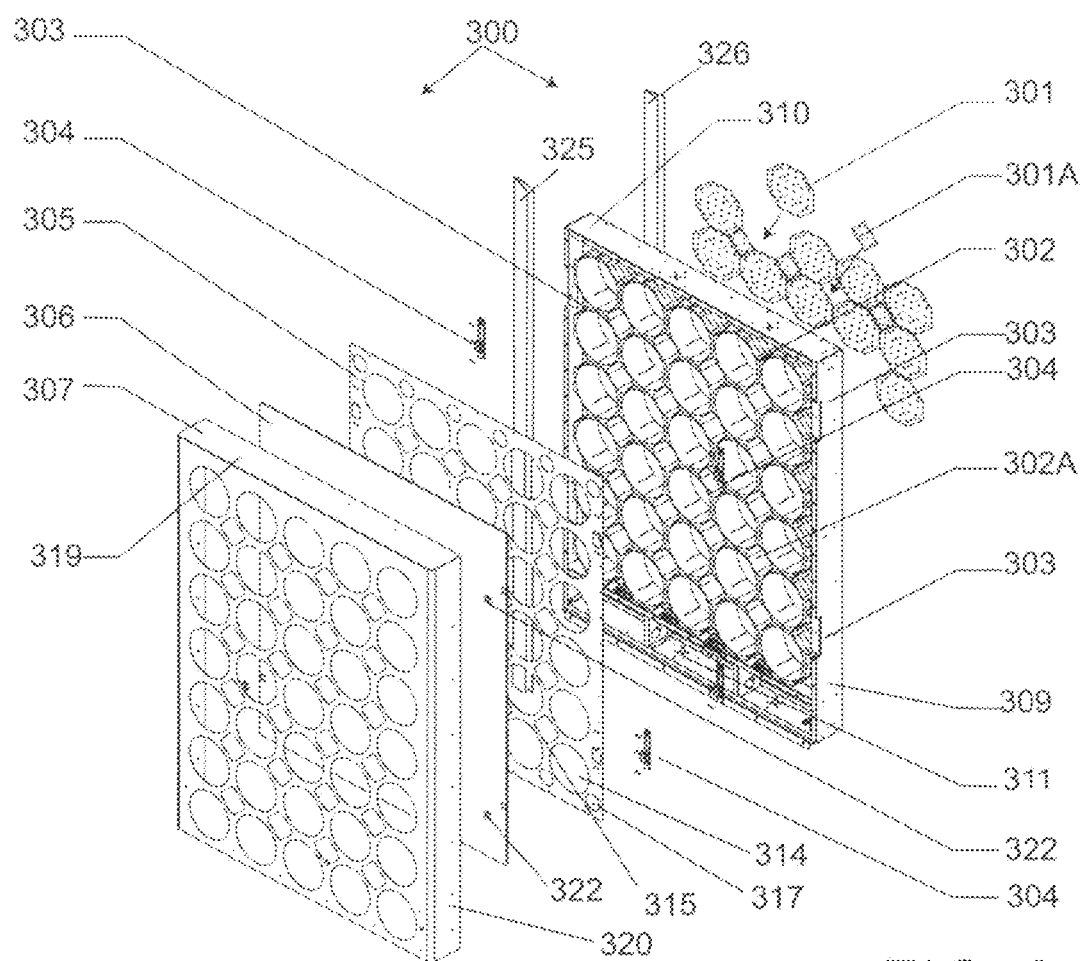
FIG. 3 is an exploded, isometric assembly view of a preferred display module assembly used with the vending machines of the invention.

With initial reference directed to FIGS. 1, 2 and 3 of the appended drawings, a system consisting of a plurality of automated retail machines connected via a data connection to a centralized, backend operations center system has been generally designated by the reference numeral 100. At least one automated retail machine 101 is deployed in a physical environment accessible by a consumer who can interact with the machine 101 directly. There can be any number of machines 101, all connected to a single, remote logical operations center 130 via the Internet 120 (or a private network).

The operations center 130 can physically reside in a number of locations to meet redundancy and scaling requirements. The machine software is composed of a number of segments that all work in concert to provide an integrated system. Logical area 102 provides the interface to deal with all of the machine's peripherals such as sensors, keypads, printers and touch screen. Area 103 handles the monitoring of the machine and the notifications the machine provides to administrative users when their attention is required. Area 104 controls the reporting and logging on the machine. All events on the machine are logged and recorded so they can be analyzed later for marketing, sales and troubleshooting analysis. Logical area 105 is responsible for handling the machines lighting controls.

Logical area 106 is the Inventory Management application. It allows administrative users on location to manage the inventory. This includes restocking the machine with replacement merchandise and changing the merchandise that is sold inside the machine. Administrative users can set the location of stored merchandise and the quantity.

Logical area 107 is the retail store application. It is the primary area that the consumers use to interface with the system. This is the area that the majority of the processes described in FIG. 6 occur. Logical area 108 handles the controls required to physically dispense items that are purchased on the machine or physically dispense samples that are requested by a consumer. Logical area 109 controls the inventory management system allowing authorized administrative users to configure and manage the physical inventory in the machine. Area 110 controls the payment processing on the machine. It manages the communication from the machine to external systems that authorize and process payments made on the machine. Area 111 is an administrative system that allows an authorized user to manage the content on the machine. This logical area handles the virtual administrative user interface described previously. The content can consist of text, images, video and any configuration files that determine the user's interaction with the machine.

The latter applications interface with the system through an application layer designated in FIG. 1 by the reference numeral 112. This application layer 112 handles the communication between all of these routines and the computer's operating system 113. Layer 112 provides security and lower level messaging capabilities. It also provides stability in monitoring the processes, ensuring they are active and properly functioning. Logical area 131 is the user database repository that resides in the operations center 130. This repository is responsible for storing all of the registered user data that is described in the following figures. It is logically a single repository but physically can represent numerous hardware machines that run an integrated database. The campaign and promotions database and repository 132 stores all of the sales, promotions, specials, campaigns and deals that are executed on the system. Both of these databases directly interface with the real-time management system 133 that handles real-time requests described in later figures. Logical area 134 aggregates data across all of the databases and data repositories to perform inventory and sales reporting. The marketing management system 135 is used by administrative marketing personnel to manage the marketing messaging that occurs on the system; messages are deployed either to machines or to any e-commerce or digital portals. Logical area 136 monitors the deployed machines described in FIG. 2, and provides the tools to observe current status, troubleshoot errors and make remote fixes. Logical area 137 represents the general user interface portion of the system. This area has web tools that allow users to manage their profiles and purchase products, items and services. The content repository database 138 contains all of the content displayed on the machines and in the web portal. Logical area 139 is an aggregate of current and historical sales and usage databases comprised of the logs and reports produced by all of the machines in the field and the web portals.

An automated retail vending machine 200 that was represented logically as 101 in FIG. 1 is illustrated in FIG. 2. Much of the hardware details are explained in the aforementioned pending applications that have been incorporated by reference herein. Display module 210 can be attached with a hinge 226 to a vending machine comprised of a rigid upright cabinet with rigid sides 223 and top 224, or the module can be mounted to a solid structure as a stand-alone retail display. The display module 210 forms a door that is hinged to the cabinet sides 223 adjacent a vertical control column 211. A variety of door configurations known in the art can be employed. For example, the display doors can be smaller or larger, and they can be located on one or both sides of the control column 211. The display doors can have multiple square, oval, circular, diamond-shaped, rectangular or any other geometrically shaped windows. Alternatively, the display area can have one large display window with shelves inside.

A customizable, lighted logo area 201 (FIG. 2) is disposed at the top of column 211. Touch screen display 202 is located below area 201. Panel 203 locates the machine payment system, coin acceptor machine or the like. Additionally panel 203 can secure a receipt printer, keypad, headphone jack, fingerprint scanner or other access device. The product retrieval area 204 is disposed beneath the console 211 in a conventional compartment (not shown). A key lock 205, which can be mechanical or electrical such as a punch-key lock, is disposed beneath the face of the module 210. One or more motion sensors 214 are disposed within smaller display tubes within the console interior. A plurality of generally circular product viewing areas 207 and a plurality of generally diamond shaped viewing areas 206 are defined upon the outer the face of the casing 208 that are aligned with internal display tubes behind the product viewing surface areas, though the shape of the viewing areas may alter with various merchandising concepts. However, the convention of framing merchandising offerings is consistent to enable intuitive interfacing whether a physical or virtual representation of the merchandise display. The reference numeral 209 designates an exterior antenna that connects to a wireless modem inside the machine providing connectivity.

With reference directed to FIGS. 2-3, a lighting system display module constructed in accordance with the best mode of the invention has been generally designated by the reference numeral 300 (FIG. 3). A vending machine console equipped with the display case lighting arrangement has been generally designated by the reference numeral 200 (FIG. 2). Lighting and display system 300 includes a variety of hardware and software adaptations to facilitate the various objects and advantages discussed above when integrated within a vending machine. Lighting effects are established by various circuits that control various LED-equipped circuit boards in response to software discussed hereinafter. Lighting circuit boards and components are disposed upon various product display and vending modules that are visible from the front of the vending machine 200 (FIG. 2).

A plurality of LED octagonal circuit boards 301 are arranged into geometric arrays and patterns in orderly rows and columns. Smaller, generally rectangular, secondary LED circuit boards 301A are arranged between LED boards 301. The shape of the boards 301, 301A is not critical, and they can be circular, triangular, rectangular, or other shapes, depending upon the artistic impression desired. Preferably the boards are polygonal, and in the best mode, they are octagonal. Boards 301, 301A are fastened within display case 303. A plurality of primary display tubes 302 arranged in an array comprising rows and columns line up with the LED circuit boards 301. The preferably, tubular plastic display tubes 302 have a generally circular cross section, into which the octagonal circuit boards 301 fit. A plurality of smaller, secondary display tubes 302A are disposed between larger display tubes 302 in an orderly fashion to register with rectangular LED circuit boards 301A. The tubes 302, 302A may assume other geometries, including cubicle form or parallelepiped shapes, as long as they can fit the item to be vended.

Display case 303 is generally rectangular, and box-like, comprising bordering sides 309, a top 310, and bottom 311, the width of which established a sufficient depth to shroud the display tubes 302 and related components.

A plurality of sensors 304 (FIG. 3) are coupled between selected display tubes 302. A plurality of preferably circular orifices 314 are defined in plate 305 to align with display tubes 302. Rectangular orifices 315 align with display tubes 302A. A plurality of smaller auxiliary orifices 317 are located about the periphery of extrusion cover mounting plate 305 for wiring.

A generally rectangular, translucent glass or plastic window 306 is secured over extrusion cover mounting plate 305 utilizing mounting orifices 322. Window 306 is preferably clear and translucent for visibility. Display case 303, cover mounting plate 305 and window 306 are secured in overlying relationship within the module 300 by a rigid exterior casing 307 that shrouds the apparatus. Casing top and bottom 319 and sides 320 comprise a plurality of spaced apart mounting holes for suitable fasteners. Casing 307 is attached to the display case 303 with a hinge 325 that allows access to the areas where the products are displayed.

Products being featured are stored within display tubes 302 and/or 302A for illumination in accordance with the lighting scheme described in detail below. Products to be vended are stored in the rear of the vending machine 200 (FIG. 2) in a conventional fashion, and payment is received via a credit or debit transaction or alternative payment method such as a coin or dollar input accomplished with conventional coin acceptance machines and conventional vending circuitry known to those with skill in the art. Selected products are vended though conventional passageways in the vending machine to which console 200 is mated.

The embodiment illustrated in FIG. 3 includes five columns and seven rows of displays, but alternative arrays with different number of rows and columns can be used. In addition, the shapes and sizes of the display windows and display tubes may vary as well.

Figure 4:
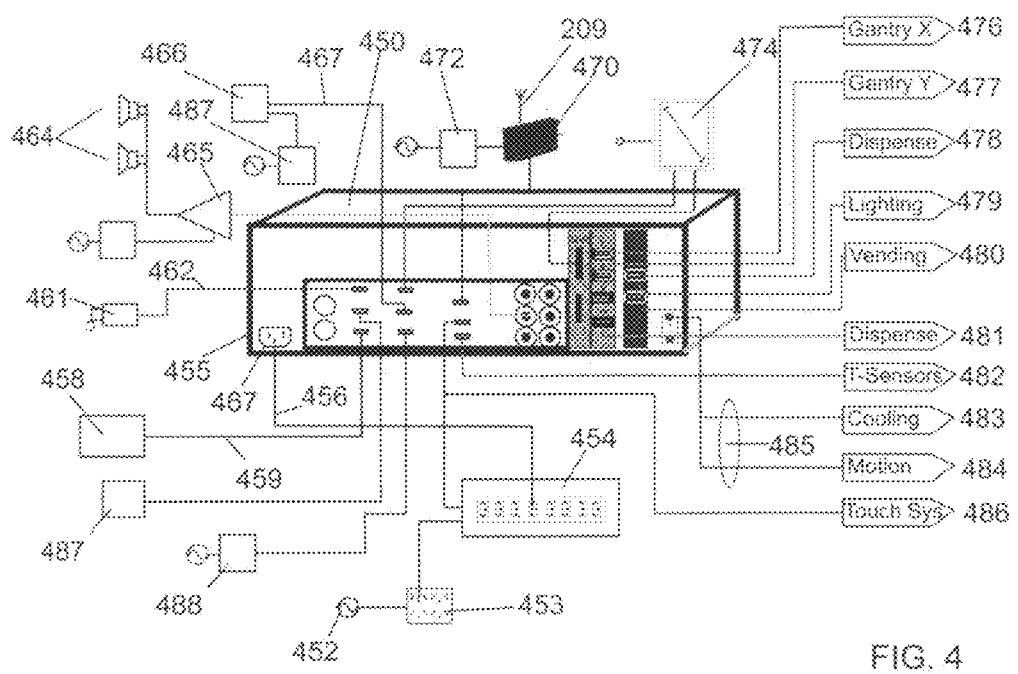
FIG. 4 is a diagrammatic view showing the preferred interconnection of the system computer and communication hardware.
Figure 5:
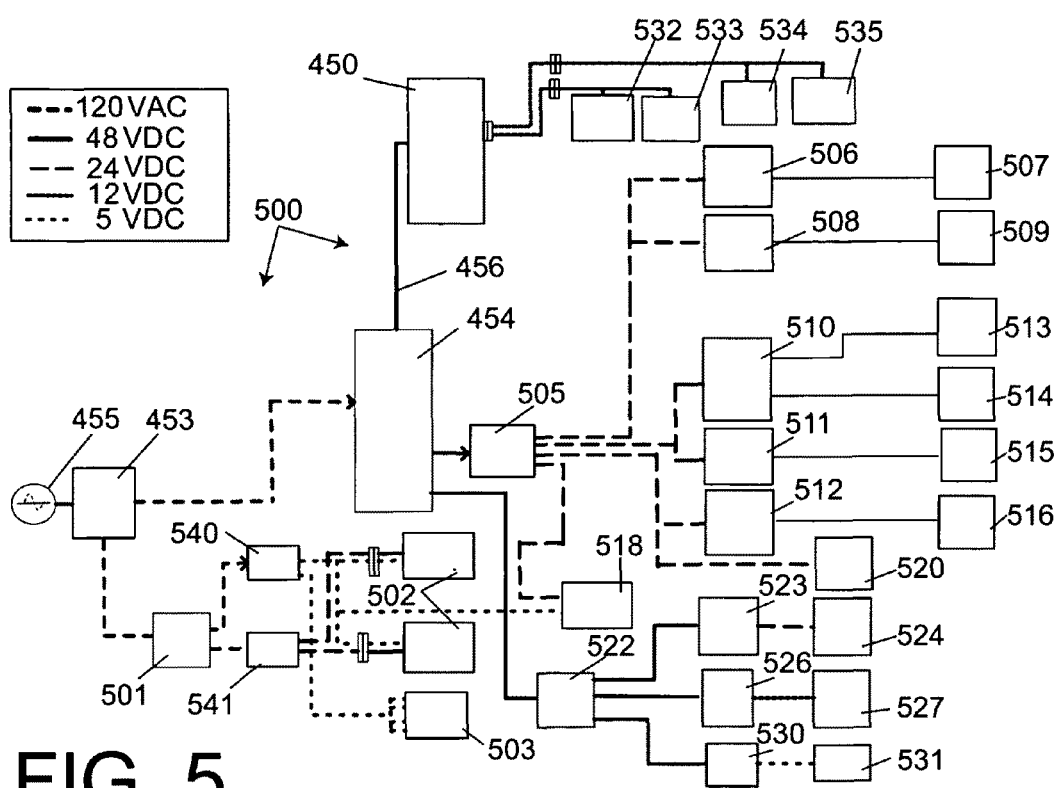
FIG. 5 is a block diagram of the preferred electrical power supply arrangement.

FIGS. 4 and 5 illustrate system wiring to interconnect with a computer 450 such as Advantech's computer engine with a 3 Ghz CPU, 1 GB of RAM memory, 320 GB 7200 RPM hard disk drive, twelve USB ports, at least one Serial port, and an audio output and microphone input. The computer 450 (FIGS. 4, 5) communicates to the lighting system network controller via line 479. Through these connections, the lighting system is integrated to the rest of system. Power is supplied through a plug 452 that powers an outlet 453, which in turn powers a UPS 454 such as TripLite's UPS (900 W, 15 VA) (part number Smart1500LCD) that conditions source power, which is applied to input 455 via line 456. Power is available to accessories through outlet 453 and UPS 454.

Computer 450 (FIG. 4) is interconnected with a conventional payment reader 458 via cabling 459. An optional web-accessing camera 461 such as a LOGITECH webcam (part number 961398-0403) connects to computer 450 via cabling 462. Audio is provided by transducers 464 such as Happ Controls four-inch speakers (part number 49-0228-00R) driven by audio amplifier 465 such a Happ Controls Kiosk 2-Channel Amplifier with enclosure (part number 49-5140-100) with approximately 8 Watts RMS per channel at 10% THD with an audio input though a 3.5 mm. stereo jack connected to computer 450. A receipt printer 466 such as Epson's EU-T300 Thermal Printer connects to the computer 450 via cabling 467. The printer is powered by a low voltage power supply such as Epson's 24 VDC power supply (part number PS-180). A remote connection with the computer 450 is enabled by a cellular link 470 such as Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as a Ceronix 22" Widescreen (16:10) Touch Monitor for computer operation also connects to computer 450. A Bluetooth adapter 487 such as D-Link's DBT-120 Wireless Bluetooth 2.0 USB Adapter is attached to the CPU allowing it to send and receive Bluetooth communication. A wireless router 488 such as Cisco-Linksys' WRT610N Simultaneous Dual-N Band Wireless Router is connected to the CPU to allow users to connect to the machine via a private network created by the router.

Digital connections are seen on the right of FIG. 4. Gantry-X, stepper motor controller such as the Arcus Advanced Motion Driver+Controller USB/RS485 (part number Arcus ACE-SDE), and Gantry-Y stepper motor controller such as the Arcus Advanced Motion Driver+Controller USB/RS485 (part number Arcus ACE-SDE) connections are designated by the reference numerals 476 and 477 respectively. Dispenser control output is designated by the reference numeral 478. LED lighting control signals communicate through USB cabling to a DMX controller 479 that transmits digital lighting control signals in the RS-485 protocol to the display tube lighting circuit board arrays. An ENTTEC-brand, model DMX USB Pro 512 I/F controller is suitable. Cabling 480 leads to vending control. Dispenser door control is effectuated via cabling 481. Touch sensor inputs arrive through interconnection 482. Cooling fans are controlled through cabling 483. Motion sensor inputs from a motion sensor such as Digi's Watchport/D (part number Watchport/D 301-1146-01) are received through connection 484. Cabling connections 483 and 484 are shielded as indicated by reference numeral 485. The touch system is connected to the computer 450 via cabling 486.

FIG. 5 illustrates a detailed power distribution arrangement 500. Because of the various components needed, power has to be converted to different voltages and currents throughout the entire system. The system is wired so that it can run from standard 110 V.A.C. power used in North America. It can be converted to run from 220 V.A.C. for deployments where necessary. Power from line-in 455 supplied through plug 452 (FIG. 4) powers a main junction box 453 with multiple outlets (FIGS. 4, 5) that powers UPS 454 which conditions source power, and outputs to computer 450 line 456. Power is available to accessories through main junction box 453 and Ground-fault current interrupt AC line-in 455. An additional AC outlet strip 501 such as Triplite's six position power strip (part number TLM606NC) powers LED lighting circuits 502 and a touch system 503. Power is first converted to 5 volts to run the lighting board logic using a converter 540. Another converter, 541, converts the AC into 24 Volt power to run the lights and touch system. An open frame power supply 505 (FIG. 5) provides 24 VDC, 6.3 A, at 150 watts. Power supply 505 powers Y-controller 506 such as the Arcus Advanced Motion Driver+Controller USB/RS485 (part number Arcus ACE-SDE), that connects to Y axis stepper 507. A suitable stepper 507 can be a Moons-brand stepper motor (part number Moons P/N 24HS5403-01N). Power supply 505 also connects to an X controller 508, which can be an Arcus-brand Advanced Motion Driver+Controller USB/RS485 (part number Arcus ACE-SDE), that connects to X axis stepper 509. A Moons-brand stepper motor (part number Moons P/N 24HS5403-01N) is suitable for stepper 509.

Power supply 505 (FIG. 5) also powers dispenser controller 510, dispenser door control 511, and vending controller 512. Controller 510 powers gantry motor 513 and two conveyor motors 514 and 515. Motors 514 and 515 can be Canon-brand DC gear motors (part number 05S026-DG16). Door stepper motor 515 can be a Canon DC gear motor (part number 05S026-DG16). Controller 512 operates spiral motors 516 such as the Vendapin Universal 24 volt DC gear motor (part number 605008-001). The logo space 201 (FIG. 2) is illuminated by lighting 518 (FIG. 5) powered by supply 505. Supply 505 also powers LCD touch screen block 520 (FIG. 5) such as a Ceronix 22" Widescreen (16:10) Touch Monitor. UPS 454 (FIG. 5) also powers an AC outlet strip 522 that in turn powers a receipt printer power supply 523 such as Epson's 24 VDC power supply (part number PS-180) that energizes receipt printer 524 such as Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as Multitech's Verizon CDMA cellular modem (part number MTCBA-C-IP-N3-NAM). A proximity sensor 214 (FIG. 2) such as a Digi Watchport/D part number 301-1146-01 is connected to the CPU 450. 532 is a door sensor and actuator such as Hamlin's position and movement sensor (part 59125) and actuator (part 57125) which are connected to the CPU 450.

Subroutine 600 (FIG. 6) illustrates the preferred visual selection process. Each step in the process is logged in a file recording the time, machine ID and session variable along with any user-selected data such as products chosen. The process begins when the user selects the visual selection user interface 601 on the touch screen. The system can also be programmed to display this screen at startup or when a user touches the façade in cases where a touch display system is utilized. Again referencing the touch façade system, and as detailed in the above-mentioned co-pending utility application titled "Interactive and 3-D Multi-Sensor Touch Selection Interface For an Automated Retail Store, Vending Machine, Digital Sign, or Retail Display," touching of the façade can be programmed to launch the visual selection interface. Actions conducted on the physical façade are replicated accordingly on the visual selection interface. A physical touch on the area in front of a product on the façade represents the same action as a selection on the same product represented on the touch screen visual interface.

Figure 8:
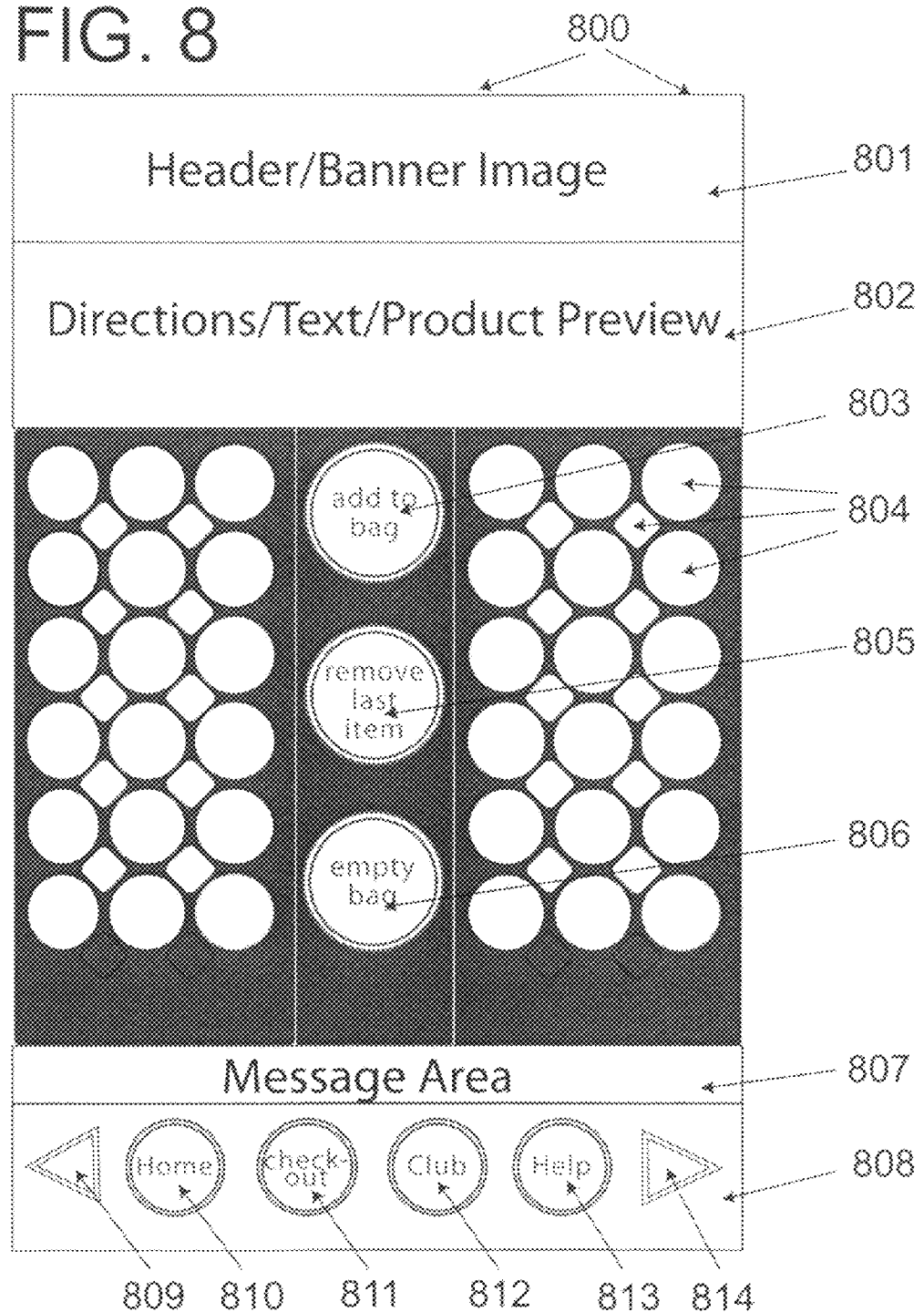
FIG. 8 is an example screen template for the preferred visual selection touch screen graphical user interface.

Once in the visual selection interface, the user is then presented the main visual selection screen 602. This is represented in FIG. 8 with the section 802 (FIG. 8) filled with directions and text on how to use the interface as detailed out by administrative personnel. This information resides on the machine as an Extensible Markup Language (XML) file where it is called by this process. From this screen, the user then has multiple options. Depending on the state of the application, some user options may be conditional on the user's state. These steps are denoted by the dotted lines connecting to steps 602 and 604. The user's state is determined by session variables that store various pieces of information about the user's actions for any given session. These are referenced each time the main visual screen interface 800 (FIG. 8) is displayed in step 602 and when the product preview form of this screen is displayed in step 604.

At any time, the user may select the checkout button 811 (FIG. 8) that will take them to step 603 that displays the virtual shopping bag screen. The virtual shopping bag screen will list out any items that the user added to their shopping bag, or shopping cart. The user may also select any product or item visually displayed in the visual selection interface depicted on the screen, taking them to step 604.

Step 604 displays a preview of the product/item selected in the designated area 802 (FIG. 8) of the graphical user interface. When the user selects an item by touching the virtual representation of it on the screen, step 604 uses the product identification number for the item to retrieve the preview description for that item. This information is stored in a database or a file folder structure as a combination of extensible markup language documents such as XML or XAML (Extensible Application Markup Language (XAML). The preview information is a subset of critical information that a user could consider crucial in making a purchase decision. This information may include but is not limited to the price, a brief description, and a larger image of the product. Each of these items is stored by the product identification number associated with the item that the user selected.

Step 604 also highlights the product in the virtual façade display by altering the background coloring of that item on the touch screen. This process also alters the lighting in the corresponding area that is associated with the selected product identification number in the physical display. For purposes of vending machine software disclosure, this software algorithm that lights a physical display in conjunction with a user action is disclosed in Pending U.S. utility application Ser. No. 12/589,164, entitled "Vending Machines With Lighting Interactivity And Item-Based Lighting Systems For Retail Display And Automated Retail Stores," filed Oct. 19, 2009, mentioned earlier. The color, hue, saturation and intensity (lightness) of the physical light and the onscreen color highlighting are stored in an XML as defined in the aforementioned patent. These settings are configured by an authorized administrator before application runtime and dictate how the application responds to user input in the above scenario.

From step 604 the user may also select to add the product being previewed to their virtual shopping bag by selecting the one of add to bag buttons on the screen which will bring them to step 612. Step 612 adds the item to a software list in memory that represents the items in the virtual shopping bag and tracks the order in which it was added. This information is stored in local memory and associated with the current session identification number that was created at the start of the user's interaction with the machine. Step 612 also highlights the product in the virtual façade display by altering the background color of the item. In reference again to the aforementioned pending patent Ser. No. 12/589,164, the lighting for the corresponding item associated with the selected product identification number in the physical display will alter as well. These lighting settings are also configured by an authorized administrator before application runtime and dictate how the application responds to user input in the above scenario. Any item added to the virtual shopping bag will remain highlighted as long as it is present in that virtual shopping bag. This coloring in the virtual façade and lighting in the physical façade provide an easy to understand visual cue as to what items the user has already selected.

From the main visual selection screen displayed in 602, the user also has the option to remove the last item they added to their virtual shopping bag. This option is conditional on whether the user has any items already in their virtual shopping bag and is represented by 805 (FIG. 8). The virtual shopping bag session variables are checked in step 602 as it loads the visual selection main screen 800 (FIG. 8). If they do not have any items in their virtual shopping bag, this selection is not available. If they did have at least one item to remove, they are taken to step 605 that removes the last item a user added. The item is removed by deleting the product identification number in the list of items stored in the session variable representing the virtual shopping bag in local memory. Control is then handed back to step 602 which rechecks the session variables to determine if the option is still available or not. The user may repeat this action until there are no more items left in the virtual shopping bag.

From step 602 that is displaying the main visual selection screen, the user may also select to remove all of the items they added to their virtual shopping bag taking the user to step 606. This option is also conditional upon the presence of items in the user's virtual shopping bag determined by the data stored in the session variable. Before step 602 displays the main visual selection screen, it checks the session variables and determines if this option is selectable or not. If the user has no items in their virtual shopping bag, the user may not select this button represented as 806 (FIG. 8). If step 602 determines this is a valid user option and the user selects this button, they are taken to step 606 where the user is prompted to confirm that they wish to remove all of the items in their virtual shopping bag. This action is cannot be undone so the user is given a second choice to confirm the action. The process continues to step 607 that checks the user's response. If the user confirms they want to remove the items, the items are removed from the shopping bag in step 608. This step is similar to step 605 except that it clears all of the items in the shopping bag regardless of the number of different items or the quantity. All product identification numbers stored in the session variable list representing the virtual shopping bag in local memory are deleted. User control is returned by step 609 to the originating step (602 or 604) depending from which step the user selected to remove all items 606. Since the user may initiate step 606 from either step 602 or step 604, the application must keep track of the originating source by noting the current screen in its history session variable. When the control is returned, it forces a refresh of the screen by calling the step (602 or 604) to recheck the session variables determining which options are available to the user. If the user does not wish to delete all of the items in their virtual shopping bag, step 607 sends control to step 609 that directs user control back to the originating step (602 or 604) that called step 606.

Like step 602, step 604 also checks the session variables each time it loads to determine which options are available to the user. Like step 602, if the option is available, step 604 allows the user to go to step 605 to remove the last item the user added to their virtual shopping bag. Like step 602, step 604 also allows the user to remove all of the items in their virtual shopping bag in step 606 if the user had items present in their bag. Like step 602, in step 604 the user may also select to checkout and proceed to step 603. The user may also select another product or item in the virtual display. However, since step 604 is only reached by selecting an item, there are additional options available. The user may select to add the currently displayed product to their virtual shopping bag by selecting this button noted as 803 (FIG. 8). Selecting this button bring the user to step 612. Step 612 is a subprocess that adds the associated product identification number of the selected item to the list of items in the virtual shopping bag that is stored in a session variable. After the step 612 subprocess completes, control is handed back to step 604. Step 604 rechecks the session variables to determine if any of the conditional user options have changed availability and then refreshes the screen.

From step 604, the user can also select to display the more product information taking them to step 613. Step 613 takes the user out of the visual selection mode into the main application that will bring the user to the main product display page for the selected item. The product identification number is passed to the application that uses it to retrieve additional stored information about that item. The user may return to the visual selection interface via step 611 by immediately selecting the back button 809 (FIG. 8) from the product display page or by selecting the visual selection button from the home screen which is reachable through the user navigation area located on every application screen and noted by 808 (FIG. 8). If a user returns the visual selection interface via the back button, the screen the user navigated away from is redisplayed. If the user returns to the visual selection interface through any other method, the session variables that store the visual selection interface's state are read in step 601 and the user returns to step 602. The state of visual selection process is retained as long as the user's session is active. Sessions will terminate if a specified amount of time has elapsed, the user selects to sign out of a session, or if a transaction completes, such as the purchasing of a product or products. If a session terminates, all session variables are deleted.

From step 604 the user may select to receive a sample of the product being previewed if a sample is available for the selected product. If one is not available, the option will not be shown to the user. The sample process 610 takes the user through a verification process to determine the eligibility of the user and also the dispensing of the sample. For purposes of vending machine software disclosure, this software algorithm was detailed in pending U.S. utility application Ser. No. 12,798,803, entitled "Customer Retention System and Process in a Vending Unit, Retail Display or Automated Retail Store," filed Apr. 12, 2010 referenced above. After the sample process, the user may return to the visual selection interface via step 611 by selecting the back button 809 (FIG. 8) until they return to a visual selection screen or by selecting the visual selection button from the home screen which is reachable through the user navigation area located on every application screen and noted by 808 (FIG. 8). Upon reaching the visual selection screen, the session variables are rechecked and the screen is displayed according to the current state.

When the user wishes to purchase items they added to their virtual shopping bag, from either step 602 or step 604, they may select the checkout button 811 (FIG. 8) that will bring the user to step 603. Step 603 checks the virtual shopping bag session variables and presents the user with a list of items they added to their bag during their session. They may address the quantities of the items by pressing a marked onscreen button to add to the quantity or an alternative onscreen button to subtract from the quantity for each item listed in the shopping bag. When the user is satisfied with the products and the quantities they wish to purchase, they can select to pay for the product or they can cancel and return to the visual selection page. If they select to pay, they proceed to step 614 that collects the user's payment information and performs error checking. When the payment method has been validated using an external payment authorization service, the physical dispensing process begins in step 615. Step 616 monitors the dispensing. If there was an error, a message is displayed to the user in step 617. This step can also reverse any payment transactions if necessary along with initiating any system processes needed to return the machine to a functional state and notify service and maintenance personnel as necessary.

If the vending process worked correctly, the process continues to step 618 where the exterior door to the collection area is opened and the user is prompted to collect their purchase. A sensor in the collection area monitors the space to detect when a user retrieves their product. Step 619 monitors these sensors. If a preset amount of time elapses and the machine does not detect that the user has retrieved their product, the process proceeds to step 620 and the user is re-prompted to retrieve their purchase. This prompting may take the form of written messages on the screen, animations and videos indicating where and how to pick up their product. Audio and lighting cues may complement the aforementioned. When the machine detects that the vended merchandise has been retrieved, the process continues to step 621 where a message is displayed thanking the user. This process also closes the exterior door to secure the collection area. It initiates system processes that reset the mechanical components to their ready state. It also terminates the session removing any state variables of the visual selection process. This includes but is not limited to items that were selected and the history of actions taken during the session. After this is complete, the process ends in step 622.

Figure 7:
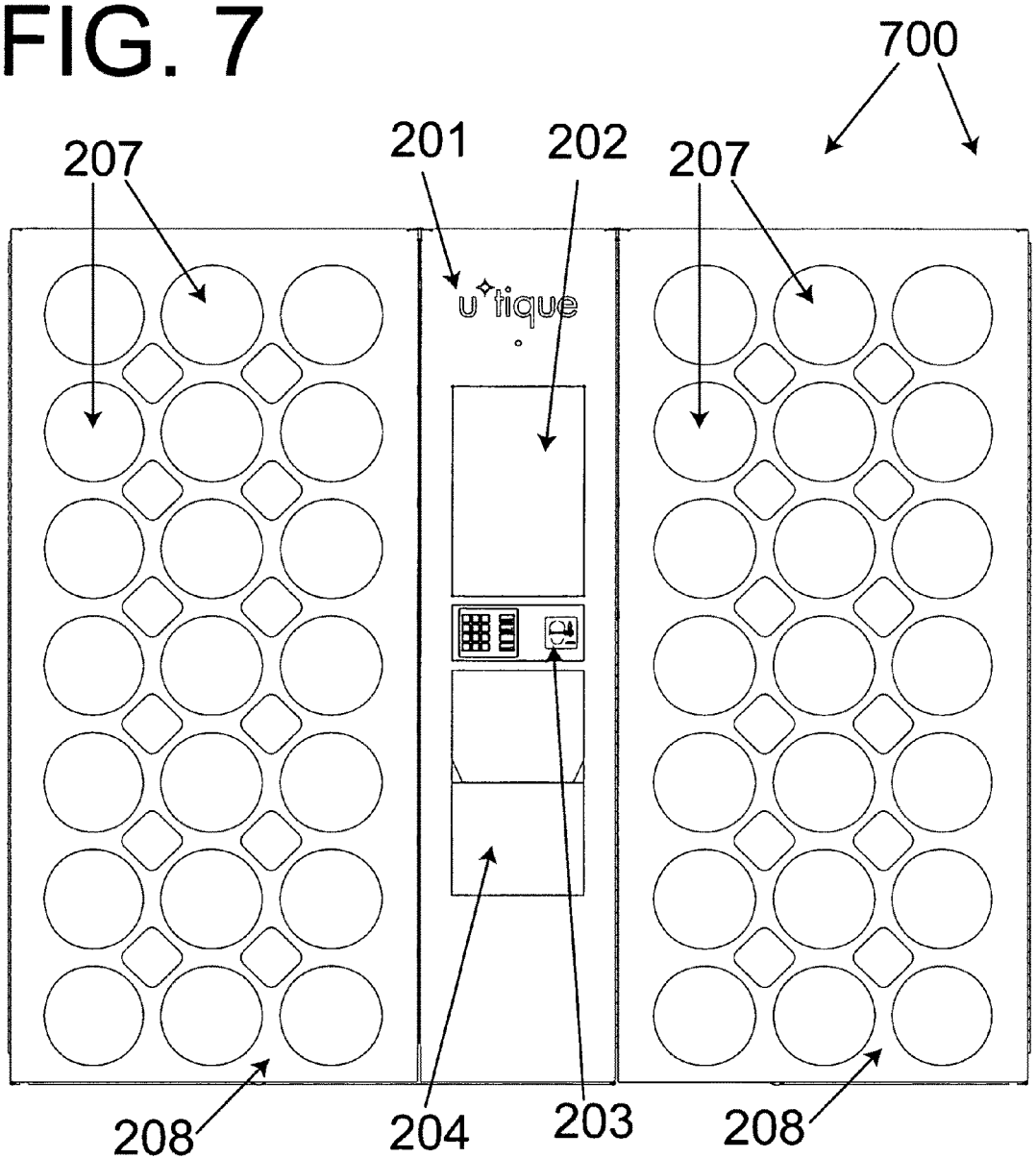
FIG. 7 is a front elevation view of an assembled vending machine module.

FIG. 7 shows a front elevation of another configuration of an automated retail vending machine 700, similar to that illustrated in FIG. 2. This machine is structurally similar to the one depicted in FIG. 2 with the difference of having two façade doors with a different display configuration. Like components, however, are employed, and they are demoted with the same reference numerals as illustrated in FIG. 2 and discussed in the corresponding text.

Figure 6:
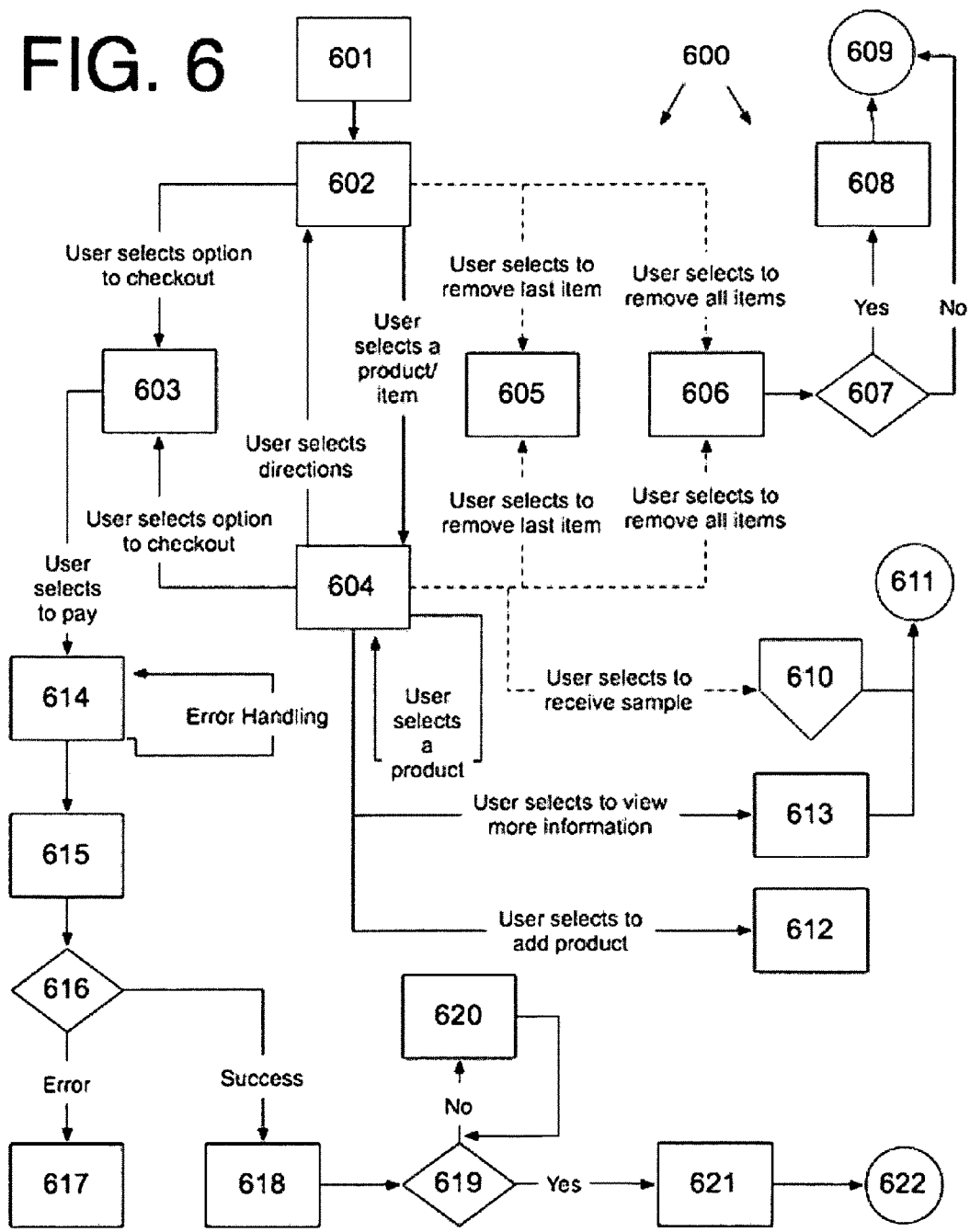
FIG. 6 is a software block diagram of the preferred visual selection process.

FIG. 8 shows an example of a graphical user interface 800 that corresponds to the machine depicted in FIG. 7. Region 801 is reserved for a header or banner, comprising either be a logo, title or screen directions. The area can be configured to display images, rich text or a combination of both. Area 802 is area reserved for additional text, directions, notifications, messages and the product preview area as referenced in step 604 (FIG. 6). Virtual selection button 803 allows a user to add the product being previewed to their virtual shopping bag as in step 612 (FIG. 6). It is only active and selectable if a product is currently being previewed. Displays 804 mimic the façade/display illustrated in FIG. 7 (i.e., showing the display tubes). This is an image of the physical façade is overlaid with a list of coordinates relating to the image (or image map) to define the product areas. The image can be created from the engineering façade drawings and uploaded on to a machine by an administrative user during the machine's initial configuration. The image map uses the façade map file to determine which products appear in which positions. The façade map file is the same file used by the lighting system referenced in pending patent Ser. No. 12/589,164. Administrative users of the system can change the arrangement of the products in the virtual façade by updating the image map and façade map file without changing the program code. The new files are read it at runtime and the screen is rendered accordingly. Each one of these areas defined by the image map can contain an image or virtual representation of the physical product on display in the machine in FIG. 7. These areas are selectable. When a user selects one of these areas, the product preview area 802 is populated with additional information for that designated product and the color of the area is changed as defined in step 604 (FIG. 6).

Virtual selection button 805 enables the user to remove the last item they added to the bag. This process is defined as step 605 (FIG. 6). Virtual selection button 806 allows a user to remove all of the items in their virtual shopping bag. This process and its restrictions are defined in step 606 (FIG. 6). 807 is an area that can be used to provide the user with additional messages, notifications or advertisements.

Area 808 is the navigation area. It is comprised of a number of selectable buttons that the user may use to navigate the application. Virtual selection button 809 provides a "back" function, allowing the user to return to the previous screen they were viewing. Virtual selection button 810 is the "checkout" button. It is defined in step 603 (FIG. 6). Virtual selection button 812 is a selectable button that takes the user into the Club program. This functionality was originally described in pending U.S. utility application Ser. No. 12/798,803, entitled "Customer Retention System and Process in a Vending Unit, Retail Display or Automated Retail Store," filed Apr. 12, 2010, referenced earlier.

Virtual selection button 813 takes the user to a help screen that provides additional information about using the application. Virtual selection button 814 is a "forward" button that takes the user to a screen they already viewed if the previously selected the "back" button 809 which took them back into their history. It is not active or selectable if the user is viewing the last page in their user history sequence.

Figure 9:
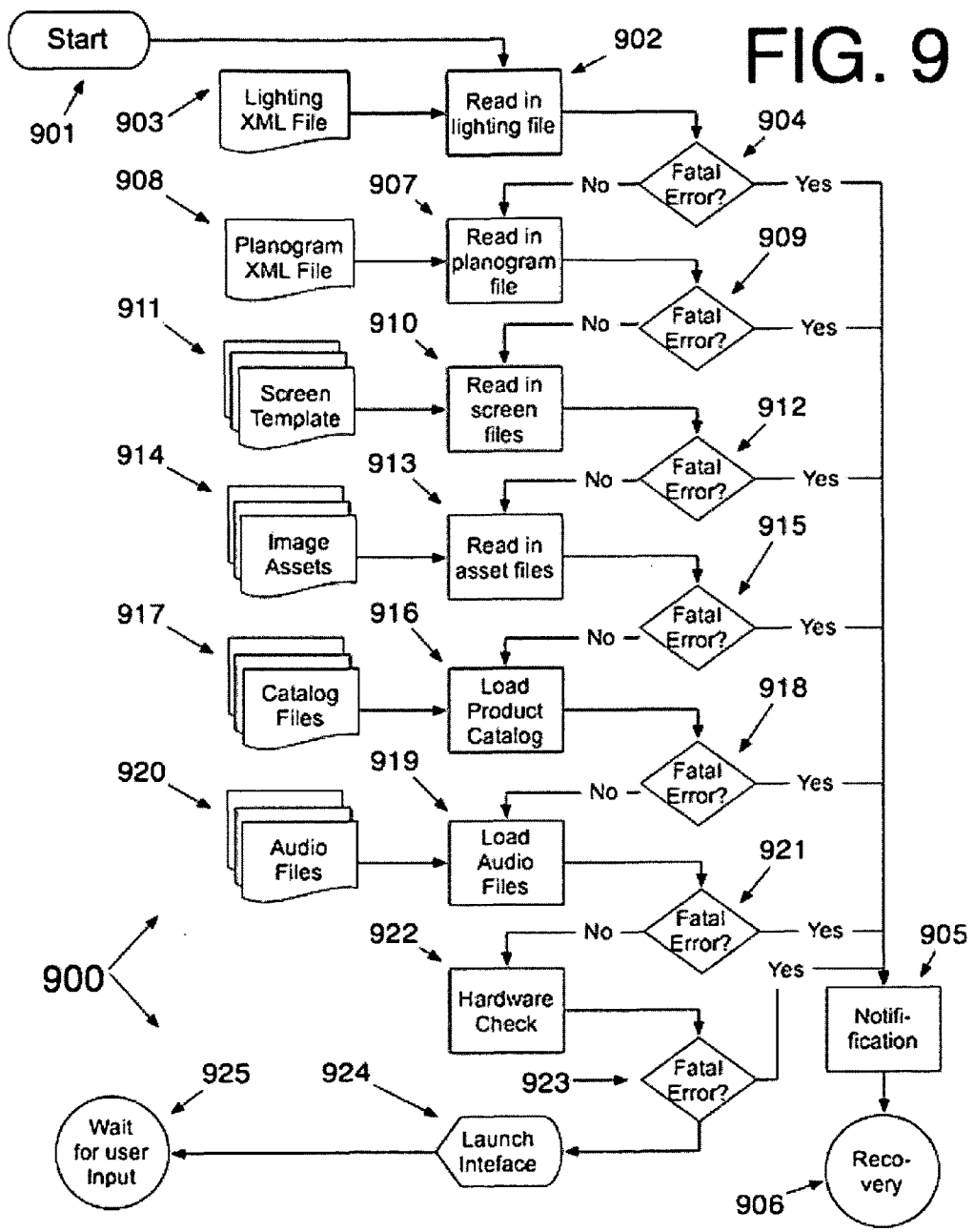
FIG. 9 is a software block diagram of the preferred visual selection runtime initialization process; and, FIG. 10 is a software block diagram of the preferred visual selection screen rendering process.

Subroutine 900 (FIG. 9) illustrates the preferred method of initializing the visual selection system at system runtime. The process begins at step 901 when the system application is launched. Step 902 reads in and parses the lighting XML file 903. The lighting file contains a sequence of lighting sequences to be performed for various user actions on the system such as selecting a product, adding to the virtual shopping bag and removing it from the shopping bag. These lighting sequences dictate both the onscreen coloring of products in the virtual display and the lighting of products in the physical display. These values are cached in local memory as an application variable. Step 904 checks if there are any fatal errors. Fatal errors are ones that prevent the system from allowing a user to complete a transaction. All errors are logged using the reporting and logging system 103 (FIG. 1). Non-fatal errors are noted in the log file so they can be examined later to correct the issue. If the error is fatal, the process goes to step 905 that sends out an alert notification to the notification system 103 (FIG. 1). The system will attempt to recover in step 906 by attempting to start the process again and reinitialize the system. If there are no fatal errors, the process continues to step 907 that reads in and parses the planogram file 908. The planogram file contains the product identification number, or item identification number, a product name and a Boolean value if it is active or not for each display slot number. These values are cached in local memory as an application variable. Step 909 checks if there are any fatal errors. If there are fatal errors, it routes to step 905, otherwise the process continues at step 910. Step 910 reads in all of the screen templates 911 such as 800 (FIG. 8) that determines the layout of the visual selection interface. Step 912 checks if there are any fatal errors. If there are fatal errors, it routes to step 905, otherwise the process continues at step 913. Step 913 reads in all of the screen asset files 914 associated with the screen templates 911. These asset files can be images or extended markup files that represent buttons such as 803, 805, 806, 809, 810, 811, 812, 813, and 814 (FIG. 8), header banners graphics that fit into header areas such as 801 (FIG. 8), directions or instructions that are displayed in designated areas such as 802, 807 (FIG. 8), image map files that determine which area on an image corresponds represents which area on the physical facade or images representing the physical façade such as 804 (FIG. 8). These assets are cached into local memory in the application. Step 915 checks if there are any fatal errors. If there are fatal errors, it routes to step 905, otherwise the process continues at step 916. Step 916 reads and parses the product catalog files 917. The product catalog stores all of information, graphics, specifications, prices and rich media elements (e.g. video, audio, etc.) for each item or product in the system. Each element is organized according to its identification number. These elements can be stored in a database or organized in a file folder system. These items are cached in application memory. Step 918 checks if there are any fatal errors. If there are fatal errors, it routes to step 905, otherwise the process continues at step 919. Step 919 reads in all of the system audio files 920 and the file that the stores the actions with which each audio file is associated. Audio files can be of any format, compressed or uncompressed such as WAV, AIFF, MPEG, etc. An XML file stores the name of the application event and the sound file name and location. Step 921 checks if there are any fatal errors. If there are fatal errors, it routes to step 905, otherwise the process continues at step 922. Step 922 does a system wide hardware check by communicating with the system peripherals and controllers 102 and 108 (FIG. 1). Step 923 checks if there are any fatal errors. If there are fatal errors, it routes to step 905, otherwise the process continues at step 924. Step 924 launches the application display on the touch screen interface. The system then waits for user input 925.

Figure 10:
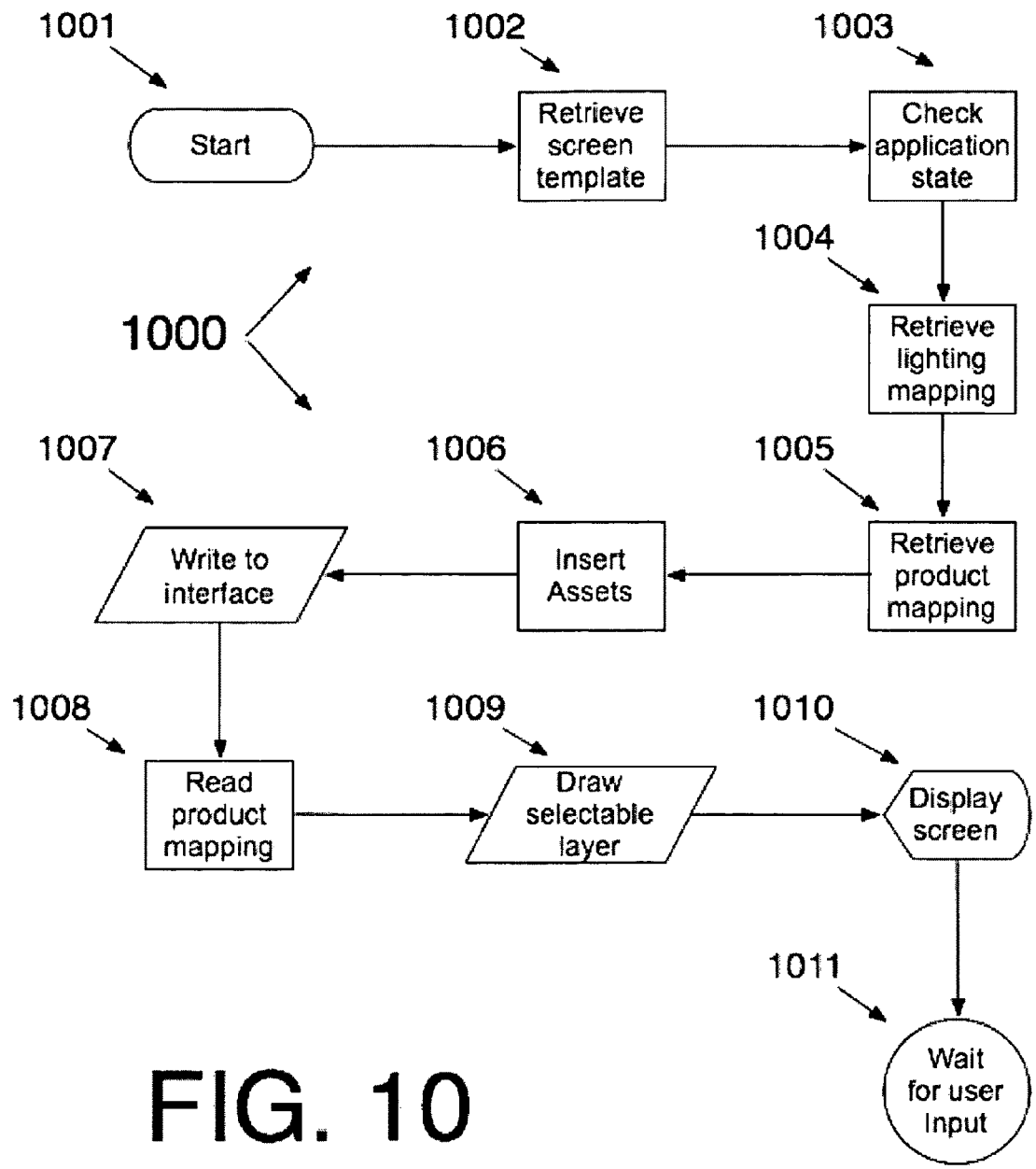

Subroutine 1000 (FIG. 10) illustrates the preferred method of rendering a selectable virtual visual selection merchandising interface. The process begins at step 1001 when a user makes a selection that brings them to the visual selection interface as defined by subroutine 600 (FIG. 6). Step 1002 retrieves the screen template 800 (FIG. 8). Step 1003 checks the application state by reading the session variables. These session variables are used to determine which assets go in which template areas, which items to display and which options are selectable by the user. Step 1004 retrieves the lighting mapping data out of the application memory. Step 1005 retrieves the product mapping data out of the application memory.

This data is used in conjunction with the application state and the lighting data to determine the coloring of the virtual display areas 804 (FIG. 8). If an action is performed by the user that has a lighting effect defined, the lighting data stored as series RGB (Red, Green, Blue) plus intensity values with transition times to indicate the amount of time to fade between color and intensity values. Step 1006 pulls the rest of the assets such as button and product catalog images out of memory. Step 1007 writes the data to the interface using the product mapping data retrieved in step 1005 and the image map file retrieved in step 1006 to determine the placement of each item on the virtual display. Step 1008 reads the product mapping and image map again to draw a selectable layer on the user interface in front of the rendered screen in step 1009. This provides the user with the interface that allows them to touch the virtual representation of an item or product and link it to an action that selects the product by calling a routine and passing in that product identification number to the application as defined in process 600 (FIG. 6). Step 1010 renders the information on the touch screen presenting it to the user. The system then waits for the user's input in step 1011.

From the foregoing, it will be seen that this invention is well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending system comprising at least one vending machine, retail display, or automated retail store, the vending system comprising:
    display module containing items to be vended, the display module physically comprising a plurality of physical displays in which items to be vended are visibly housed, the displays organized into at least one visually recognizable pattern;
    a computer for activating and controlling the vending system and said module;
    software for controlling said computer;
    a visual display controlled by said software for establishing a virtual screen for inputting customer data, the screen comprising virtual representations of said physical displays arranged in said at least one recognizable pattern, whereby images appearing on said virtual screen selected and viewed by customers correspond to actual items available in said plurality of physical displays,
    wherein said visually recognizable pattern comprises a plurality of physical rows and columns, and said virtual display comprises corresponding rows and columns of virtual images corresponding to physical items available for vending in said physical displays.

2. The vending system as defined in claim 1 wherein said software comprises:
    a beginning step initiated when a user selects a visual selection user interface on said virtual screen;
    steps for presenting a main visual selection screen to provide a user with multiple options;
    steps for selecting and viewing critical information pertaining to a potential user selection;
    steps for selecting items to be purchased and recording same in a virtual shopping bag;
    steps for optionally removing items in said virtual shopping bag;
    steps for listing the contents of the virtual shopping bag;
    steps allowing a customer to checkout; steps associated with checkout for varying the quantities of items selected; and
    steps for concluding the transaction by facilitating customer payment.

3. The vending system as defined in claim 2 wherein said virtual screen comprises a virtual selection button enabling the user to initiate said steps for removing items in their virtual shopping bag.

4. A method for vending products within a machine to a user, the machine comprising:
    a display module containing products to be vended, the display module physically comprising a plurality of physical displays in which products to be vended are visibly housed, the displays organized into at least one visually recognizable pattern;
    a computer for activating and controlling the display module;
    software for controlling said computer; wherein the method comprising the steps of:
    generating a visual display with said software for establishing a virtual screen for inputting customer data, the screen comprising virtual representations of said physical displays arranged in said at least one recognizable pattern, whereby images appearing on said virtual screen selected and viewed by customers correspond to actual items available in said plurality of physical displays,
    wherein said visually recognizable pattern includes a plurality of physical rows and columns, and further comprising the steps of correlating said virtual display with rows and columns of virtual images corresponding to physical items available for vending in said physical displays.

5. The method as defined in claim 4 including the further step of generating a vend in response to either touching of a physical display or the corresponding virtual display on the visual selection interface.

6. The method as defined in claim 4 wherein said software provides:
    a beginning step initiated when a user selects a visual selection user interface on said virtual screen;
    steps for presenting a main visual selection screen to provide a user with multiple options;
    steps for selecting and viewing critical information pertaining to a potential user selection;

steps for selecting items to be purchased and recording same in a virtual shopping bag;

steps for optionally removing items in said virtual shopping bag;

steps for listing the contents of the virtual shopping bag;

steps allowing a customer to checkout;

steps associated with checkout for varying the quantities of items selected; and steps for concluding the transaction by facilitating customer payment.

7. The method as defined in claim 4 including the further step of providing a subroutine for generating said visual display, the subroutine executing the steps of:

providing a visual selection screen that indicates user directions;

associating each product available for vending with a unique product identification number;

providing a current session identification number in response to a customer input;

visually providing a virtual shopping bag screen in response to customer inputs;

visually providing a virtual checkout button that displays the virtual shopping bag screen and lists any products that the user selected;

visually displaying a preview of the product selected, the preview comprising the product price, a textual description, and an image of the product; and highlighting the product selected in the virtual display by altering the background coloring and concurrently altering the lighting in the corresponding physical display area that is associated with the selected product identification number in the physical display.

8. The method as defined in claim 7 including the further steps of:

providing the user with the option of selecting a product being previewed to their virtual shopping bag;

adding the item selected to a software list in memory that represents the items in the virtual shopping bag and tracks the order in which products were selected;

if the user has any products within the shopping bag, providing the user with the option of removing the last selected product; and providing a checkout button for a user to check out.

9. The method as defined in claim 7 wherein said dispensing step includes the further steps of:

opening a vending door;

prompting the user to collect vended products;

monitoring the retrieval of vended products, and, if a preset amount of time elapses and a user has not retrieved their product(s), re-prompting the user to retrieve their product(s), and, if a user has retrieved their product(s) displaying a thank-you message for the customer.

10. The method as defined in claim 7 including the further steps of providing the user with a sample of a desired product being previewed if a sample is available for the selected product.

11. The method as defined in claim 8, wherein the step of providing a check out button includes the steps of:

presenting the user with a list of products currently in their shopping bag;

providing the user with the option of changing quantities of selected products;

providing the user with the option of paying for selected products or canceling the transaction;

if a user elects to pay, collecting the user's payment information; and if the payment information collected above is appropriate, dispensing the product or products selected.

* * * * *